United States Patent [19]

Tsubota

[11] Patent Number: 5,054,026

[45] Date of Patent: Oct. 1, 1991

[54] MICROPROCESSOR HAVING FUNCTIONAL REDUNDANCY MONITORING MODE OF OPERATION

[75] Inventor: Masashi Tsubota, Tokyo, Japan

[73] Assignee: NEC Corporation, Tokyo, Japan

[21] Appl. No.: 393,180

[22] Filed: Aug. 14, 1989

[30] Foreign Application Priority Data

Aug. 12, 1988 [JP] Japan ................. 63-201229

[51] Int. Cl.$^5$ ............................................ G06F 11/16
[52] U.S. Cl. .................................. 371/68.3; 364/200; 364/268.4; 364/266.4
[58] Field of Search ............... 371/68.3, 9.1; 364/200, 364/900, 268.1, 268.3, 268.4, 266.4

[56] References Cited

U.S. PATENT DOCUMENTS

| 4,541,094 | 9/1985 | Stiffler et al. ................. | 371/68.3 |
| 4,590,549 | 5/1986 | Burrage et al. ................ | 371/68.3 |
| 4,697,233 | 9/1987 | Scheuneman et al. ........ | 364/200 |
| 4,849,979 | 7/1989 | Maccianti et al. ............ | 371/68.3 |

Primary Examiner—Charles E. Atkinson
Attorney, Agent, or Firm—Sughrue, Mion, Zinn, Macpeak & Seas

[57] ABSTRACT

A microprocessor according to the present invention is established in either data processing or monitoring mode of operation, and an address code and a data code produced by itself in the monitoring mode of operation are compared with corresponding address and data codes supplied from another microprocessor in the data processing mode of operation so as to decide whether or not aforementioned another microprocessor performs without any troubles, wherein address and data comparator units of the microprocessor respectively produce an address matching signal and a data matching signals upon respective coincidences between the address and data codes and the corresponding address and data codes, however, a delay unit retards the address matching signal by a predetermined time period in a pipeline bus cycle so as to match the address matching signal with the data matching signal.

6 Claims, 13 Drawing Sheets 5,054,026

MICROPROCESSOR HAVING FUNCTIONAL REDUNDANCY MONITORING MODE OF OPERATION

FIELD OF THE INVENTION

This invention relates to a microprocessor and, more particularly, to a built-in functional redundancy monitoring configuration used for implementation of a high-reliability system.

DESCRIPTION OF THE RELATED ART

A wide variety of applications has been found in the microprocessor due to enhancement in the performance as well as functions. Some of the applications such as, for example, an electronic switching system, a terminal equipment of a bank online system and a medical electronic system are requested to achieve a high-reliability, and a high-reliability system is basically implemented by using dual or triple microprocessors which form in combination a multiple redundancy configuration.

In the multiple redundancy configuration, one of the microprocessors transfers an address signal to a memory unit to fetch an instruction code, and executes the instruction code to for processing the task. (This mode of operation is hereinbelow referred to as "usual mode of operation".) On the other hand, a monitoring mode of operation is established in the other processor or processors, and the other processors are synchronized with the microprocessor in the usual mode of operation. Since the other microprocessors are coupled at the terminals thereof to the corresponding terminals of the microprocessor in the usual mode of operation, the other microprocessors also fetch the instruction code without transferring any address signal, then executing the instruction code for parallel processing. While achieving the parallel processing, the other processors respectively produce address codes and data codes which are compared with the corresponding address code and the data code produced by the monitored microprocessor.

Whenever the corresponding address code and the data code are identical with the address codes and the data codes produced by the other microprocessors, the other microprocessors respectively produce matching signals, and the matching signals are transferred to the outside thereof and retained in the active voltage level for the rest of the bus cycle.

In detail, assuming now that first and second non-pipeline form bus cycles are formed by a single clock pulse T1 followed by a single clock pulse T2 and by a series combination of a single clock pulse T1 and three clock pulses T2, respectively, the matching signal MATCH produced in the first non-pipeline bus cycle is delivered from the microprocessor at the leading edge of the clock pulse T2 or time t1, and the matching signal MATCH remains in the active low voltage level over the first nonpipeline bus cycle. The matching signal MATCH is recovered to the inactive high voltage level at the termination of the first non-pipeline bus cycle or time t2.

Similarly, the matching signal MATCH of the second nonpipeline bus cycle goes down to the active low voltage level at leading edge of the first clock pulse T2 or time t3, and remains in the active low voltage level until the leading edge of the second clock pulse T2 or time t4. However, the matching signal MATCH is representative of a wait status over the second and third clock pulses T2. BCYST, ADRS, DATA and DS stands for a bus cycle starting signal, an address signal, a data signal and a bus cycle strobe signal, respectively.

The circuit arrangement for production of the matching signal MATCH is illustrated in FIG. 2, and three-state buffer circuits 190 are shifted into the respective high-impedance states in the absence of a mode control signal representative of a normal mode of operation NRML MODE. Reference numeral 200 designates a comparator unit, and the comparator unit 200 has a plurality of comparator circuits 200a, 200b and 200n. Bits TERMi1 to TERMin are respectively representative of internal signals such as an internally produced address signal and an internally produced data signal, and the bits of the internal signals are supplied to the comparator stages 200a to 200n, respectively. Each of the bits is supplied to an exclusive-OR gate 191 through a series combination of inverter circuits 192 and 193. When the microprocessor serves as a monitoring processor, the corresponding bits are supplied from another microprocessor to terminals TERM1 to TERMn, and are relayed to the comparator circuits 200a to 200n. One of the corresponding bits is supplied to the exclusive-OR gate 191 through a series combination of inverter circuits 194 and 195, and is compared with the bit TERMi1. The multiple bits TERMi1 to TERM of the internal signal are, thus, compared with the corresponding bits by the exclusive-OR gates 191, and the exclusive-OR gates 191 respectively establish or block conduction paths from a charge line 201 to the ground depending upon the comparative results. The voltage level on the charge line 201 is relayed through a series combination of inverter circuits 202, 203, 204 and 205 and gate transistors 206 and 207 to an AND gate 208. On the other hand, the bus cycle starting signal BCYST is supplied through a series combination of inverter circuits 209, 210, 211 and 212 and gate transistors 213, 214 and 215 to the AND gate 208, so that the matching signal MATCH is responsive to the comparative signal as well as the bus cycle starting signal BCYST to produce the waveform shown in FIG. 1.

The pipeline architecture is one of the techniques for improvement in performance. In the pipeline form bus cycle, an address signal is supplied from the microprocessor to a memory unit in such a manner as to be partially overlapped with the previous bus cycle, and, accordingly, the memory device is responsive to the address signal with a sufficient time period. The address signal thus overlapped with the previous bus cycle allows the data stream to form a pipeline outside of the microprocessor, and enhances the throughput of the bus system. Even if a low speed microprocessor is incorporated in the data processing system, a high throughput is achieved by using the pipeline form bus cycle. In other words, the low speed microprocessor in the pipeline bus system achieves a high throughput usually achieved by a high speed microprocessor in the non-pipeline bus cycle.

A problem is encountered in the prior art microprocessor with the monitoring mode of operation in that the pipeline bus cycle is hardly employed in the multiple redundancy configuration. This is because of the fact that the matching signal takes place in a non-pipeline bus cycle where the address signal and the data signal are concurrently appear on the respective bus systems, however, a time lag takes place between an address signal and a data signal associated therewith in a pipeline bus cycle. In detail, FIG. 3 shows an example of the pipeline bus cycle where each address signal is forwarded to an address bus system one-clock ahead with respect to that of the non-pipeline bus cycle. Namely, assuming now that a pipeline bus cycle starts at time t12 with a clock pulse T11A followed by a clock pulse T21A, the address signal ADRS1 is forwarded to the address bus system at time t11 in the previous bus cycle and maintained over the clock pulse T11A, and, accordingly, the data signal DATA1 appears on the data bus system from time t13 to time t15 in the subsequent bus cycle. The address bus system continues to be busy after the clock pulse T11A, because the subsequent address signal ADRS2 is forwarded thereto at time t14. Thus, the address signal and the data signal respectively appears on the bus systems in a staggered manner, and the time lag is approximately equal to the time interval of the clock pulse. Since the circuit arrangement shown in FIG. 2 effectively produces the matching signal in so far as the multiple-bits TERMi1 to TERMin of the internal signals take place in the presence of the corresponding bits supplied from another microprocessor. However, the address signal and the data signal are produced in the different bus cycles in the pipeline architecture, and, for this reason, the comparator unit 200 can not respond to the multiple-bits TERMi1 to TERMin supplied thereto at the certain interval.

SUMMARY OF THE INVENTION

It is therefore an important object of the present invention to provide a microprocessor which monitors another microprocessor operative in a pipeline bus cycle.

It is also an important object of the present invention to provide a microprocessor which forms a part of a multiple redundancy configuration where a pipeline bus cycle is established.

To accomplish these objects, the present invention proposes to retard the address matching signal in the pipeline mode of operation.

In accordance with the present invention, there is provided a microprocessor having a data processing mode and a monitoring mode of operation, the microprocessor established in the monitoring mode of operation being operative to compare address and data codes produced therein on the basis of an instruction code concurrently fetched by itself and another microprocessor with corresponding address and data codes produced by aforesaid another microprocessor established in the data processing mode of operation, the microprocessor being responsive to a non-pipeline bus cycle and a pipeline bus cycle in both of the data processing mode and the monitoring mode of operation, the microprocessor comprising: a) an address code source supplying the address code to an internal address bus; b) a data code source supplying the data code to an internal data bus; c) address terminals supplied with the address code in the data processing mode of operation and with the corresponding address code in the monitoring mode of operation; d) data terminals supplied with the data code in the data processing mode of operation and with the corresponding data code in the monitoring mode of operation; e) address comparator means coupled at one end thereof to the internal address bus an at the other end thereof to the address terminals, and operative to compare the address code with the corresponding address code to produce an address matching signal representative of a coincidence between the address signal and the corresponding address signal in the monitoring mode of operation; f) data comparator means coupled at one end thereof to the internal data bus and at the other end thereof to the data terminals, and operative to compare the data code with the corresponding data code to produce a data matching signal representative of a coincidence between the data code and the corresponding data code in the monitoring mode of operation; g) delay means operative to retard the address matching signal by a predetermined time period, thereby producing a delayed address matching signal; h) matching signal producing means operative to produce a matching signal representative of a normal execution of aforesaid another microprocessor in the concurrent presence of the data matching signal and either address matching or delayed address matching signal; and i) selecting means operative to transfer the address signal to the matching signal producing means in the non-pipeline bus cycle and the delayed address signal to the matching signal producing means in the pipeline bus cycle.

BRIEF DESCRIPTION OF THE DRAWINGS

The features and advantages of a microprocessor according to the present invention will be more clearly understood from the following description taken in conjunction with the accompanying drawings in which.

DESCRIPTION OF THE PREFERRED EMBODIMENTS

First embodiment

Arrangement of High-Reliability System

Figure 1:
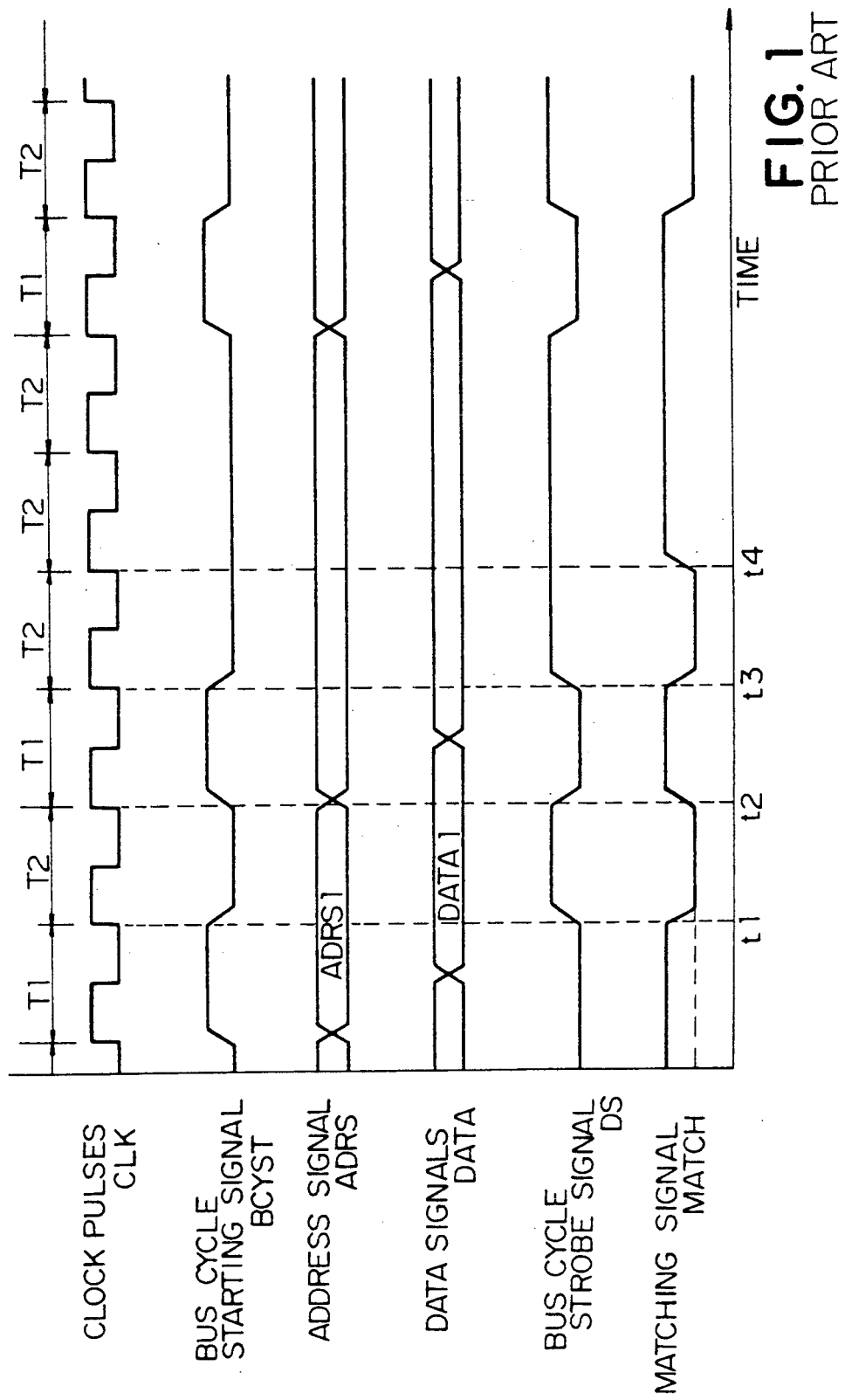
FIG. 1 is a timing chart showing the waveforms of essential signals produced by a prior art monitoring microprocessor operative in a non-pipeline bus cycle.
Figure 2:
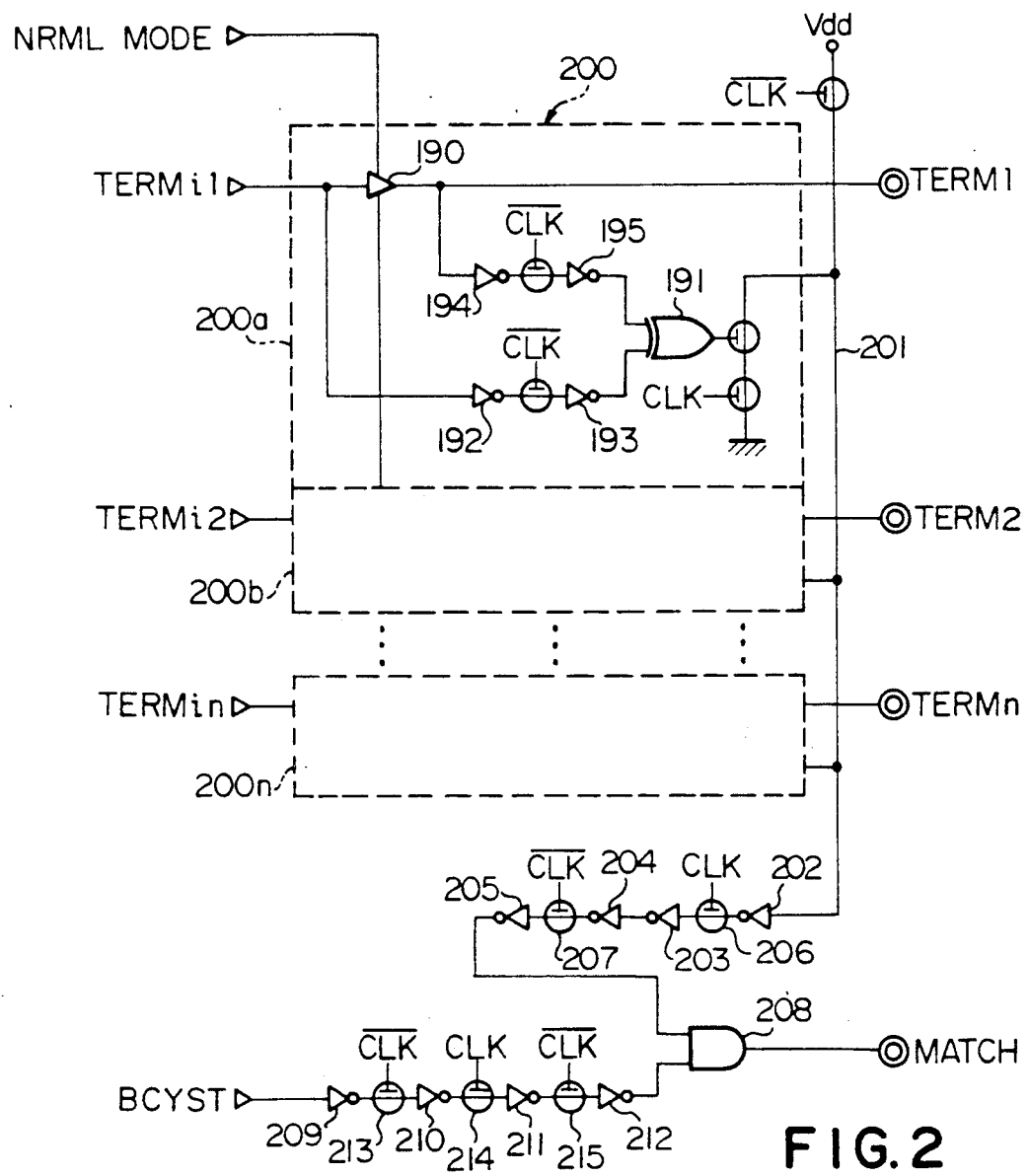
FIG. 2 is a circuit diagram showing the arrangement of a circuit incorporated in the monitoring microprocessor for production of a matching signal.
Figure 3:
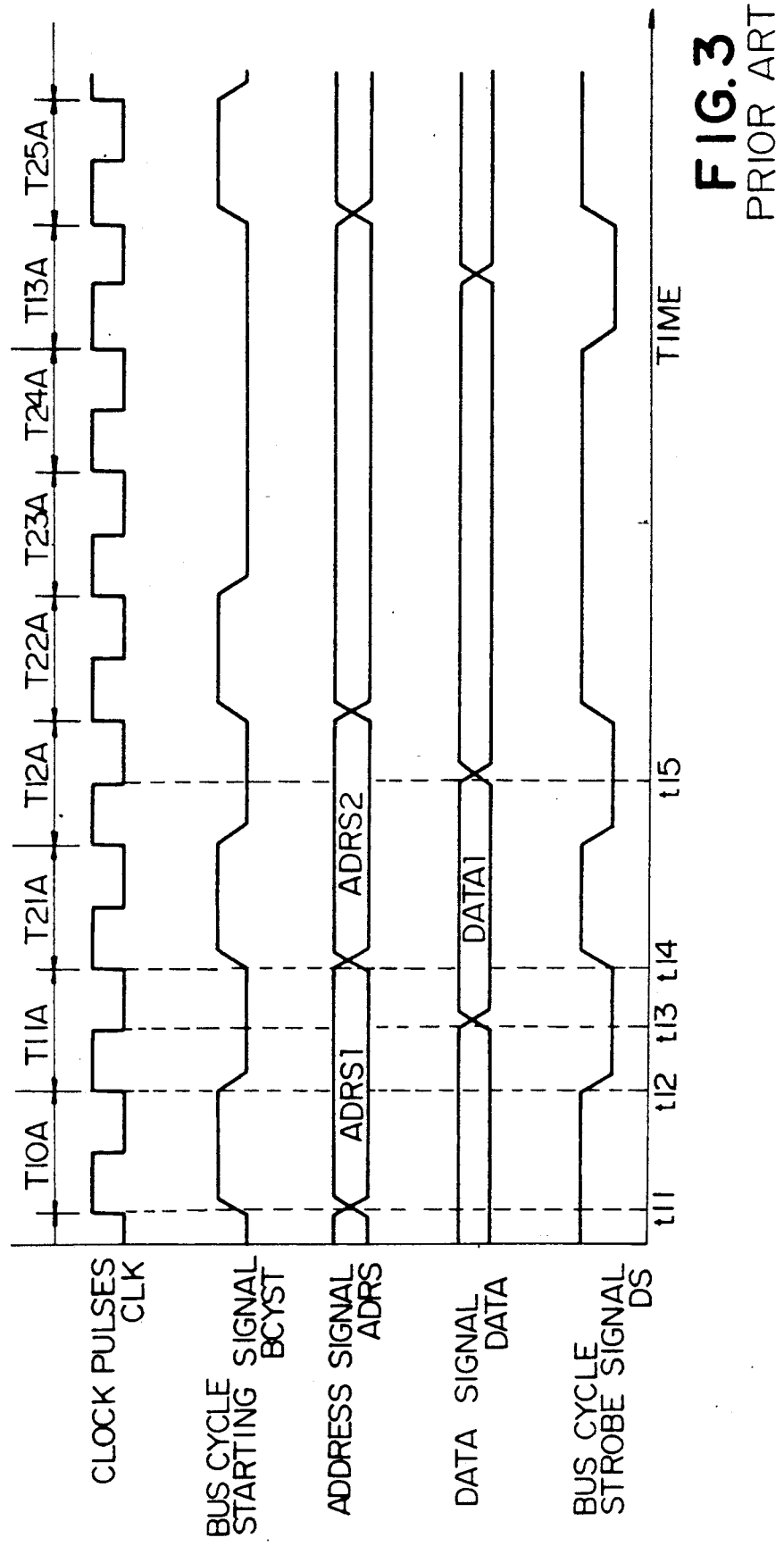
FIG. 3 is a timing chart showing the waveforms of essential signals produced by a prior art microprocessor operative in a pipeline bus cycle.
Figure 4:
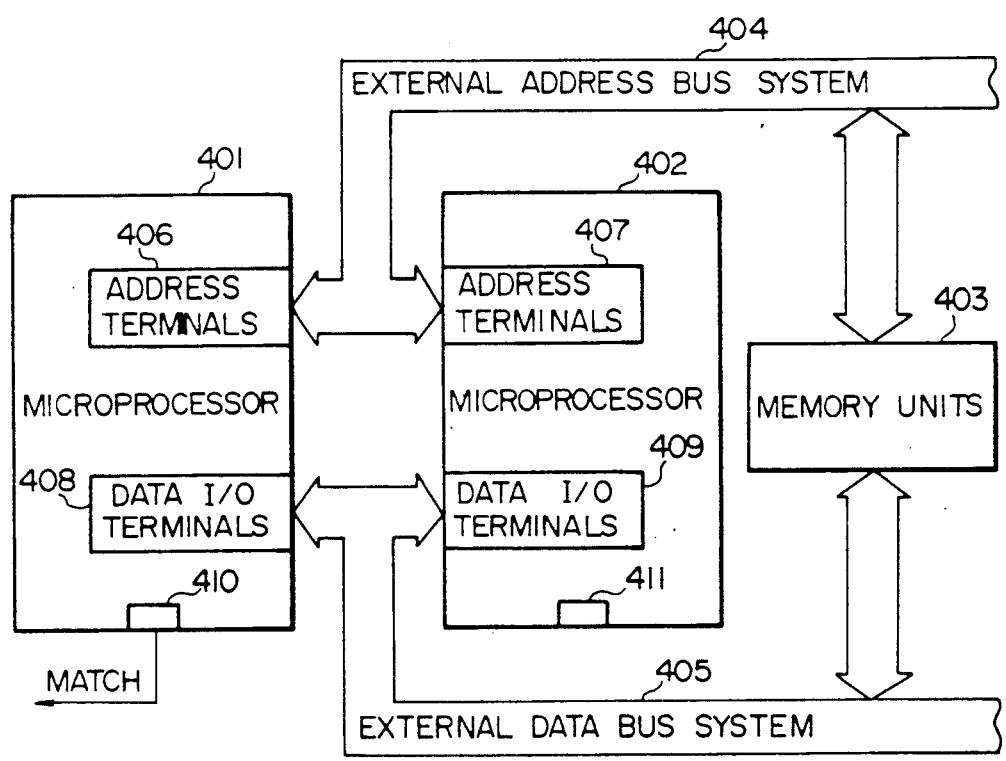
FIG. 4 is a circuit diagram showing a high reliability data processing system formed by using microprocessors embodying the present invention.

Referring first to FIG. 4 of the drawings, a high reliability data processing system is implemented by a multiple redundant configuration which comprises a plurality of microprocessors including two microprocessors 401 and 402, memory units 403, an external address bus system 404 and an external data bus system 405. The microprocessors are of the type having a data processing mode of operation and a monitoring mode of operation, and are responsive to the pipeline bus cycle. When the data processing mode of operation is established in the microprocessor 401 or 402, the microprocessor produces an address signal, fetching an instruction code, executing the instruction code in a pipeline fashion, i.e., reading out a data code from the memory units 403, performing arithmetic and logic operations or writing a data code in the memory units 403. Another function is achieved in the microprocessor 401 or 402, however, no further description is incorporated. On the other hand, if a monitoring mode of operation is established in the microprocessor 401 or 402, the microprocessor internally produces an address signal and a data signal which are compared with the corresponding signals produced by the other microprocessor, and a matching signal MATCH takes place in the microprocessor in the case where the corresponding signals are matched with one another. The microprocessor in the data processing mode of operation is hereinbelow referred to as "data processor", and, on the other hand, the microprocessor in the monitoring mode of operation is called as "monitoring processor. In this instance, the microprocessor 401 serves as a monitoring processor, and the microprocessor 402 serves as a data processor. The microprocessors 401 and 402 have address terminals 406 and 407 and data input-and-output terminals 408 and 409, respectively, and the address terminals 406 and the data input-and-output terminals 408 are directly coupled to the corresponding address terminals 407 and the corresponding data input-and-output terminals 409, respectively. Control signal terminals 410 and 411 for the matching signals MATCH are incorporated in the microprocessors 401 and 402, respectively, however, only the monitoring processor 401 produces the matching signal MATCH through a monitoring operation.

Generic Arrangement of Microprocessor

Figure 5A:
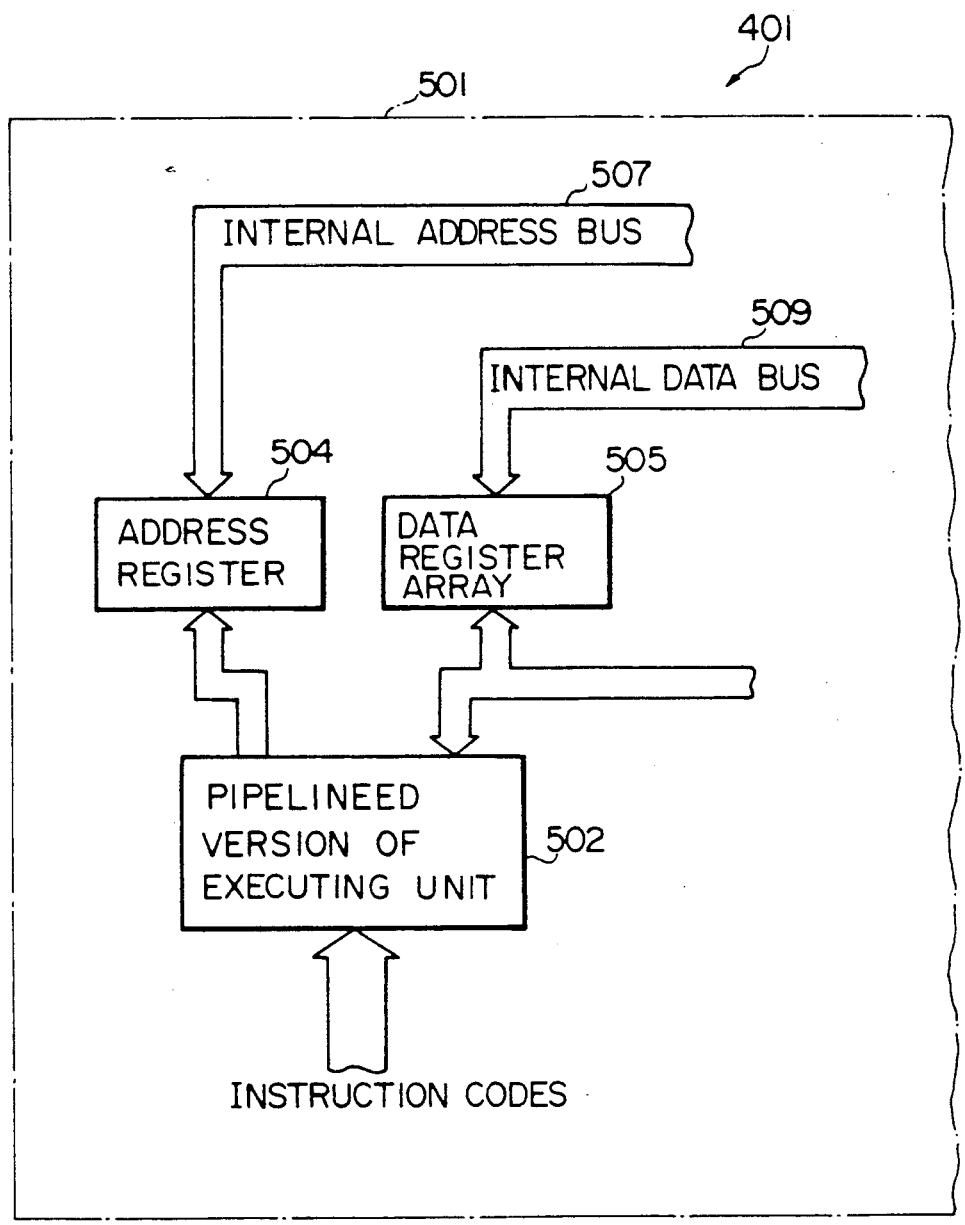
FIGS. 5A and 5B are block diagrams showing essential parts of the microprocessor according to the present invention.
Figure 5B:
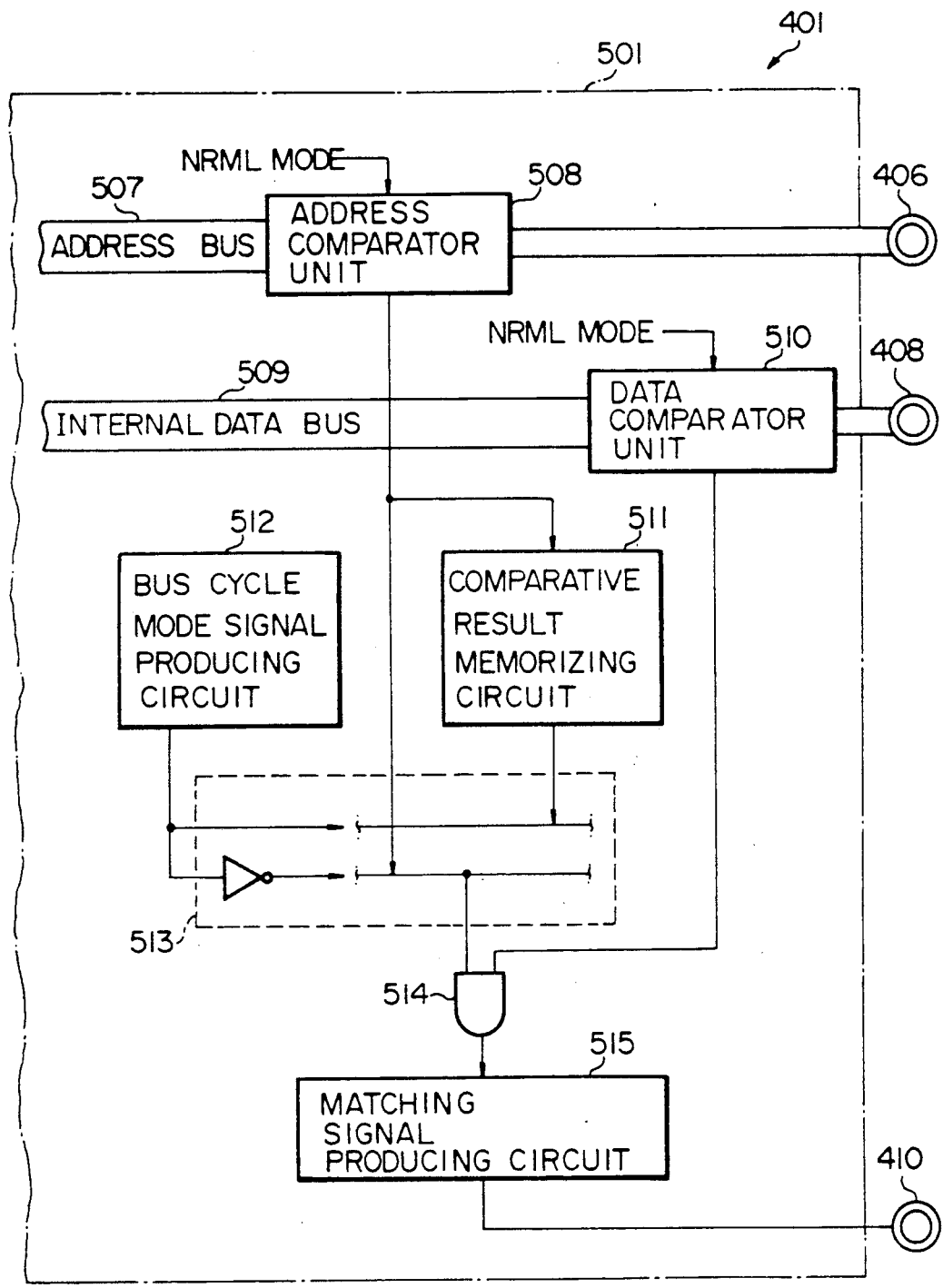

Turning to FIGS. 5A and 5B, essential parts of the microprocessor are illustrated in so far as being necessary to understand the present invention. The microprocessor 401 is fabricated on a single semiconductor chip 501 and largely comprises a pipelined version of executing unit 502 associated with an address register 504 and a data register array 505. The pipeline bus cycle and the non-pipeline bus cycle are selectively established in the microprocessor 401, and, accordingly, the pipelined version executing unit 502 executes a sequence of the instruction codes in either pipeline or non-pipeline fashion. In this instance, the address register 504 and the data register array 505 serves as a address code source and a data code source, however, those component units and circuits 502 to 505 are not directly related to the present invention, so that no further description is hereinbelow incorporated.

The address register 504 is coupled to an internal address bus 507 which in turn is coupled to an address comparator unit 508. Similarly, the data register array 505 is coupled to an internal data bus 509, and the internal data bus 509 propagates a multiple-bit internal data signal to a data comparator unit 510. The address comparator unit 508 and the data comparator unit 510 are further coupled to the address terminals 406 and the data input-and-output terminals 408, respectivelY, and are responsive to a mode signal NRML MODE representative of the data processing mode of operation. Namely, when the mode signal is shifted to an active level, the address comparator unit 508 and the data comparator unit 510 relay the internal address signal and the internal data signal to the address terminals 406 and the data input-and-output terminals 408, respectively. However, the address comparator unit 508 and the data comparator unit 510 respectively compare the internal address signal and the internal data signal with the corresponding address signal and the data signal fed from the microprocessor 402, respectively, in the absence of the mode signal NRML MODE, and an address matching signal and a data matching signal are produced by the comparator units 508 and 510, respectively, upon positive decisions.

The address comparator unit 508 is associated with a comparative result memorizing circuit 511, and the positive decision represented by the address matching signal is memorized in the circuit 511. A bus cycle mode signal is produced by a bus cycle mode signal producing circuit 512, and, then, the bus cycle signal is supplied to a multiplexer 513 for steering the address matching signals. The address matching signal is ANDed with the data matching signal at an AND gate 514, and the AND gate 514 supplies the results to a matching signal producing circuit 515. Thus, the matching signal MATCH is produced from the address matching signal and the data matching signal, and the circuit arrangements and the behaviors are hereinbelow described in detail with reference to FIGS. 6 and 7.

Circuit Arrangement of Comparator Units

Figure 6:
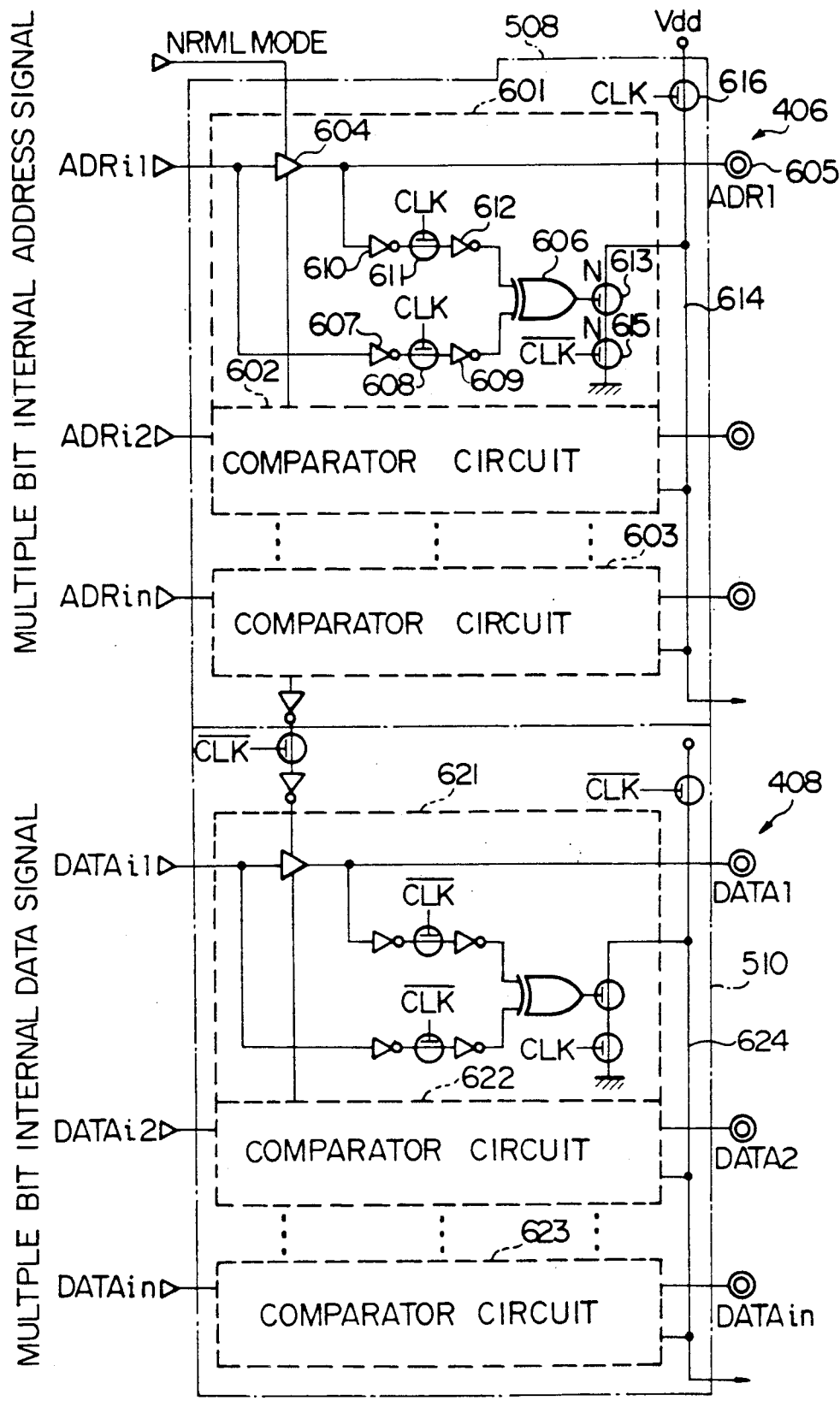
FIG. 6 is a circuit diagram showing the arrangements of an address comparator unit and a data comparator unit 510 incorporated in the microprocessor shown in FIGS. 5A and 5B.

Turning to FIG. 6 of the drawings, the address comparator unit 508 comprises a plurality of comparator circuits 601, 602 and 603, and the address bits ADRi1, ADRi2, ... and ADRin are supplied from the internal address bus 507 to the comparator circuits 601 to 603, respectively. All of the comparator circuits are similar in circuit arrangement to one another, and description is made for the comparator circuit 601 only. for avoiding repetition.

The comparator circuit 601 has a three state buffer circuit which is responsive to the mode signal NRML MODE representative of the data processing mode of operation. Namely, when the mode signal NRML MODE is shifted to the active level, the three state buffer circuit 604 becomes transparent to the address bit ADRi1, and, for this reason, the address bit ADRi1 is transferred to the one of the address terminals 406. In other words, when the microprocessor 401 is established into the data processing mode of operation or serves as the data processor, the internal address signal ADRS is supplied to the address terminals 406 for fetching an instruction code or accessing a data code.

However, when the mode signal NRML MODE is recovered to the inactive level, the three state buffer circuit 604 is shifted to the high-impedance state, and, accordingly, the internal address bus 507 is blocked from the address terminals 406. When the internal address bus 507 is isolated from the address terminals 406, the address bit ADRi1 is supplied to an exclusive OR gate 606 through a series combination of an inverter circuit 607, a gate transistor 608 and an inverter circuit 609, and the corresponding address bit ADR1 supplied from the microprocessor 402 is relayed to the exclusive OR gate 606 through a series combination of an inverter circuit 610, a gate circuit 611 and an inverter circuit 612. The exclusive OR gate 606 produces an output signal of the low voltage level in so far as the address bits ADRi1 and ADR1 are coincident with one another. If all of the exclusive OR gates in the comparator circuits 601 to 603 cause gate transistors such as 613 to be turned off, a voltage line 614 remains in the positive high voltage level, and the address matching signal takes place on the voltage line. However, the exclusive OR gate 606 allows the gate transistor 613 to turn on upon discrepancy in the address bits. The gate transistor 613 is coupled between the voltage line 614 and the ground node in parallel to the corresponding gate transistors of the other comparator circuits 602 to 603, and the gate transistor 613 thus turned on discharges the voltage line 614, thereby removing the address matching signal from the voltage line 614. The gate transistors 613 and gate transistors 615 and 616 form in combination a dynamic type AND gate, but the gate transistors 616 and 615 are supplied with a clock signal CLK and the complementary clock signal. Thus, when the monitoring mode of operation is established in the microprocessor 401, each of the comparator circuits 601 to 603 compares the internal address bit with the external address bit, and decide whether or not the address matching signal should be provided on the voltage line 614.

The data comparator unit 510 also comprises a plurality of comparator circuits 621, 622, and 623, and the data bits DATAi1 to DATAin are supplied from the internal data bus 509 to the comparator circuits 621 to 623. Each of the comparator circuits 621 to 623 is similar to each of the comparator circuits 601 to 603 with the exception that the clock signal CLK supplied to the component gate transistors are replaced with the complementary clock signal and vice versa.

The data comparator unit 510 thus arranged compares the internal data bits DATAi1 to DATAin with the external data bits DATA1 to DATAin supplied from the microprocessor 402, and produces the data matching signal on a voltage line 624 upon the positive decision or a coincidence therebetween. However, no data matching signal takes place on the voltage line 624 upon the discrepancy.

Circuit Arrangement of Matching Signal Producing Circuit

Figure 7:
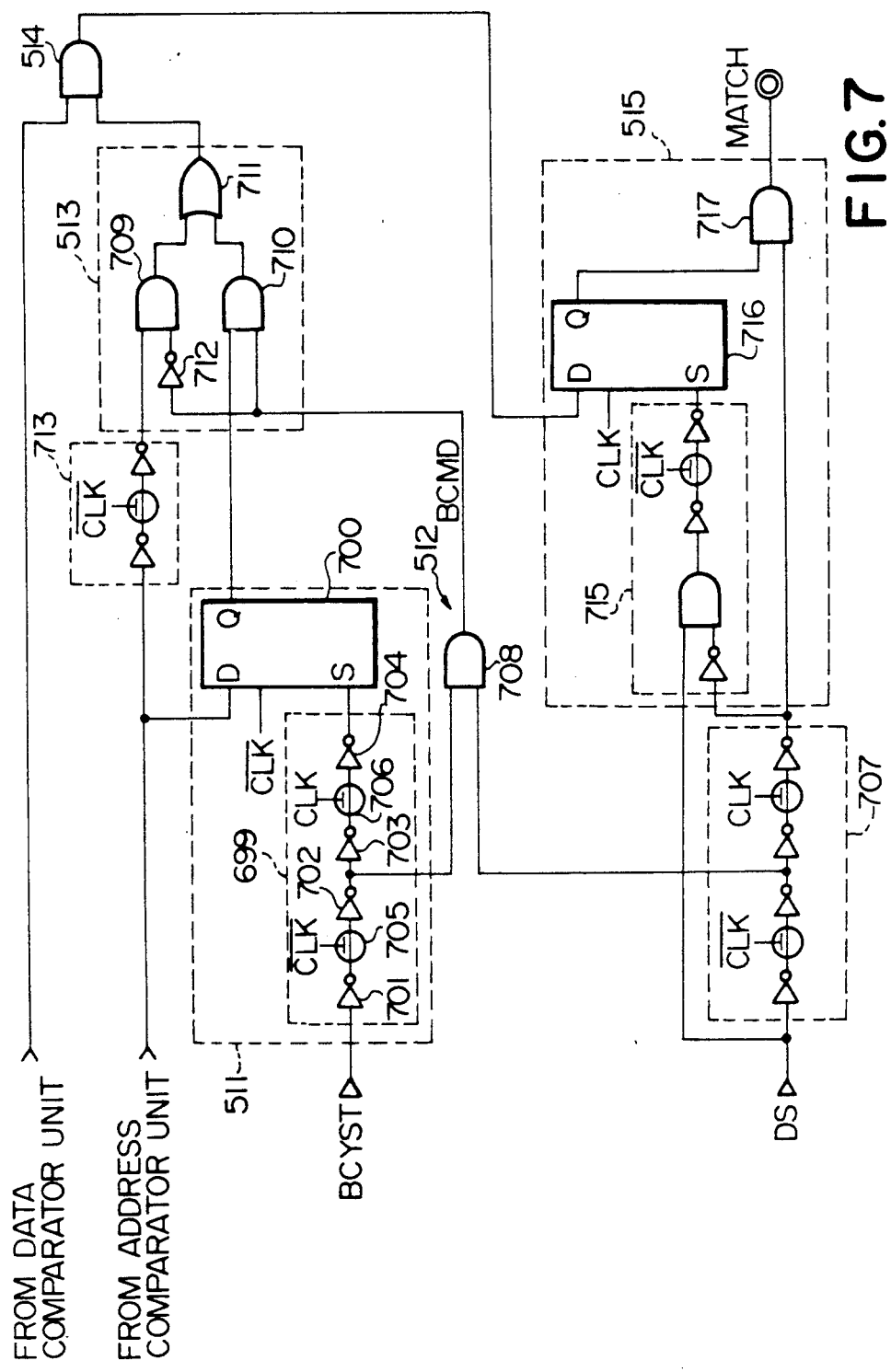
FIG. 7 is a circuit diagram showing the arrangements of a bus cycle mode signal producing circuit, a multiplexer and a matching signal producing circuit incorporated in the microprocessor shown in FIGS. 5A and 5B.

Turning to FIG. 7 of the drawings, the comparative result memorizing circuit 512 comprises a delay-type flip flop circuit 700 and a two-stage delay circuit 699 formed by a series combination of four inverter circuits 701, 702, 703 and 704 and two gate transistors 705 and 706, and a bus cycle starting signal BCYST is supplied to the delay-type flip flop circuit 700 through the series combination of the inverter circuits 701, 702, 703 and 704 and the gate transistors 705 and 706. During propagation of the series combination, the bus cycle starting signal BCYST is delayed by one clock pulse interval, and the address matching signal is stored in the delay-type flip flop circuit 700 in response to the full delayed bus cycle starting signal. A bus cycle strobe signal DS is supplied to two-stage delay circuit 707, and a half delayed bus cycle starting signal BCYST is ANDed with a half delayed bus cycle strobe signal DS at an AND gate to produce a bus cycle mode signal BCMD.

The multiplexer 513 comprises two AND gates 709 and 710, an OR gate 711 and an inverter circuit 712 associated with the AND gate 709. The address comparator unit 508 is coupled to the AND gate 709 through a delay circuit 713, and the comparative result memorizing circuit 511 is coupled to the AND gate 710. Since the bus cycle mode signal BCMD is supplied in parallel to the AND gate 710 and the inverter circuit 712, the multiplexer 513 is responsive to the bus cycle mode signal BCMD, and the multiplexer 513 selectively interconnects either of the address comparator unit 508 and the flip flop circuit 700 and the AND gate 514. In detail, the multiplexer 513 is transparent to the address comparator unit 508 in the non-pipeline bus cycle, and the output signal of the comparative result memorizing circuit 511 is transferred to the AND gate 514 in the pipeline bus cycle. The AND gate 514 is further coupled to the data comparator unit 510, so that the AND gate 514 produces a co-presence signal in the concurrent presence of the address matching signal and the data matching signal.

The matching signal producing circuit 515 comprises a timing generating circuit 715, a delay-type flip flop circuit 716 and an AND gate 717, and the bus cycle strobe signal DS and the full delayed signal thereof are supplied to the timing generating circuit 715. The delay-type flip flop circuit 716 stores the co-presence signal in response to the output signal of the timing generating circuit 715, and produces the matching signal MATCH for a predetermined time period. The predetermined time period is as long as the bus cycle strobe signal DS delayed by one clock pulse interval.

Production of Matching Signal

The circuit behaviors of the component circuits illustrated in FIGS. 6 and 7 are hereinbelow summarized with reference to FIGS. 8 and 9.

Figure 8:
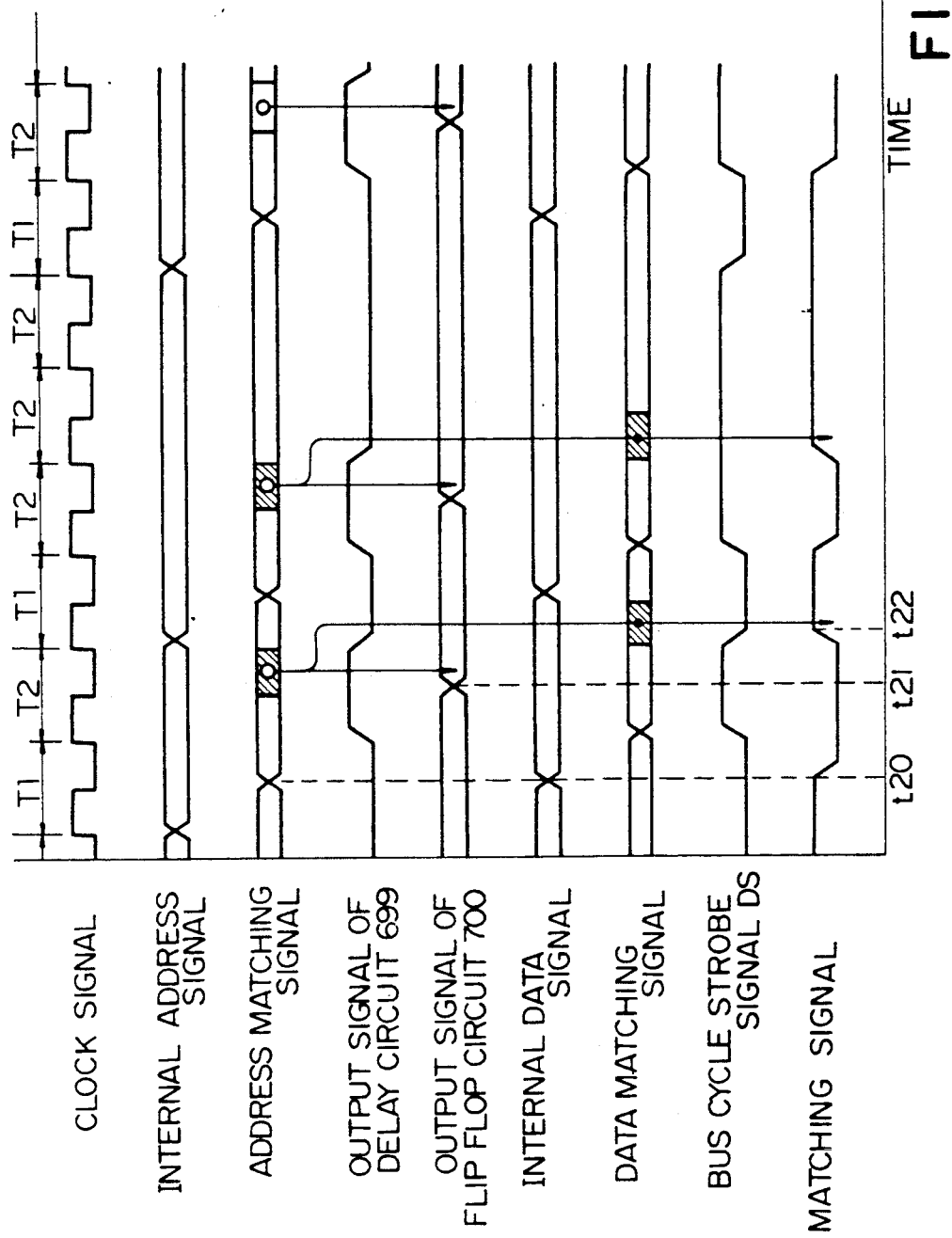
FIG. 8 is a timing chart showing the waveforms of essential signals produced in the microprocessor in a non-pipeline bus cycle.

FIG. 8 shows essential signals produced in the non-pipeline bus cycle. Assuming now that the address matching signal is produced at time t20, the address matching signal is memorized by the delay-type flip flop circuit 700 at time t21. However, the multiplexer 513 selects the address comparator unit 508, and, for this reason, the matching signal MATCH is produced at time t22.

Figure 9:
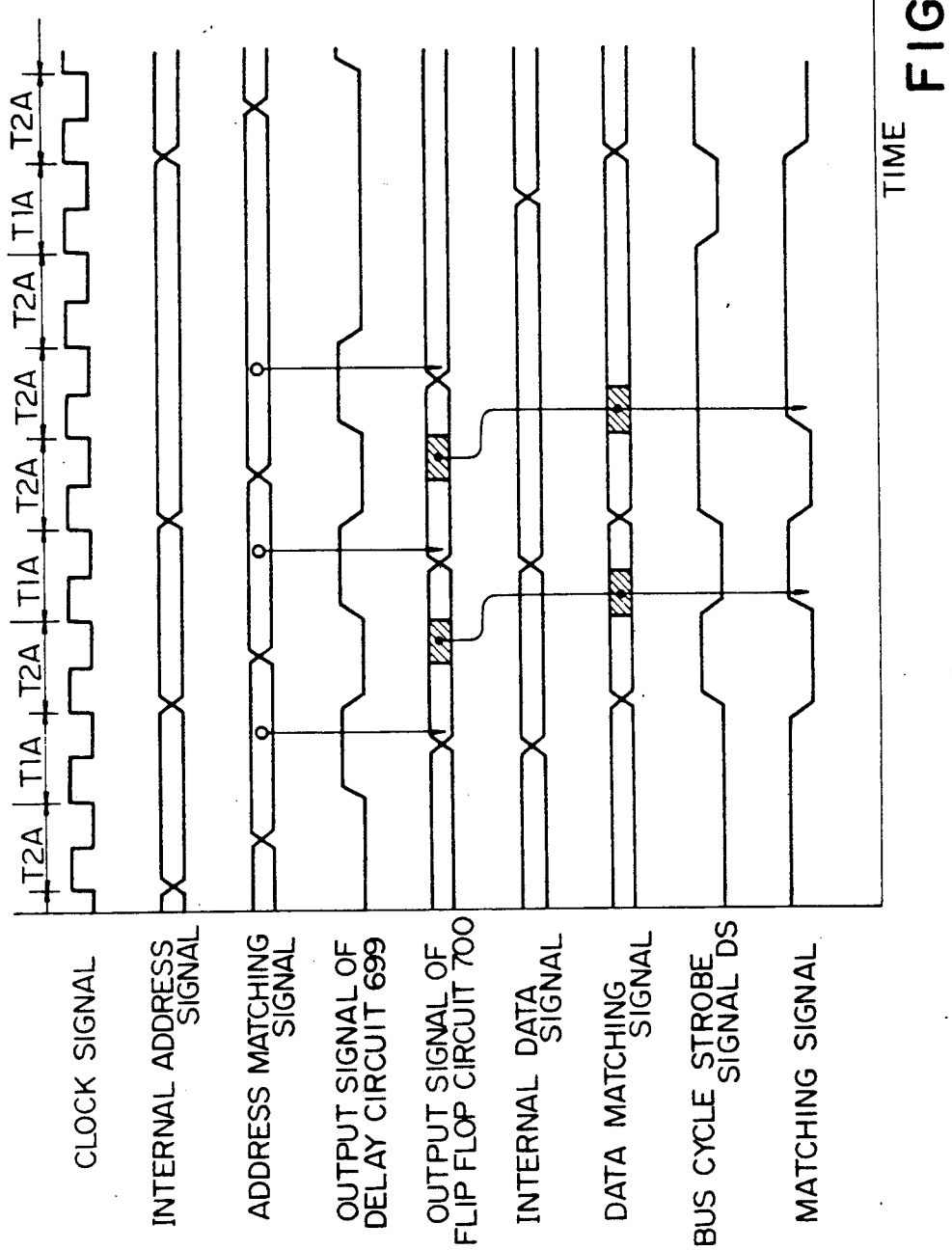
FIG. 9 is a timing chart showing the waveforms of essential signal produced in the microprocessor in the a pipeline bus cycle.

FIG. 9 shows essential signals produced in the pipeline bus cycle. In the pipeline bus cycle, the address matching signal is memorized in the delay type flip flop circuit 700 at the timing delayed by one clock pulse interval from the bus cycle starting signal BCYST, and the multiplexer 513 is transparent to the output signal of the flip flop circuit 700. Then, the co-presence signal and, accordingly, the matching signal is produced by the matching signal producing signal 515.

Second embodiment

Figure 10:
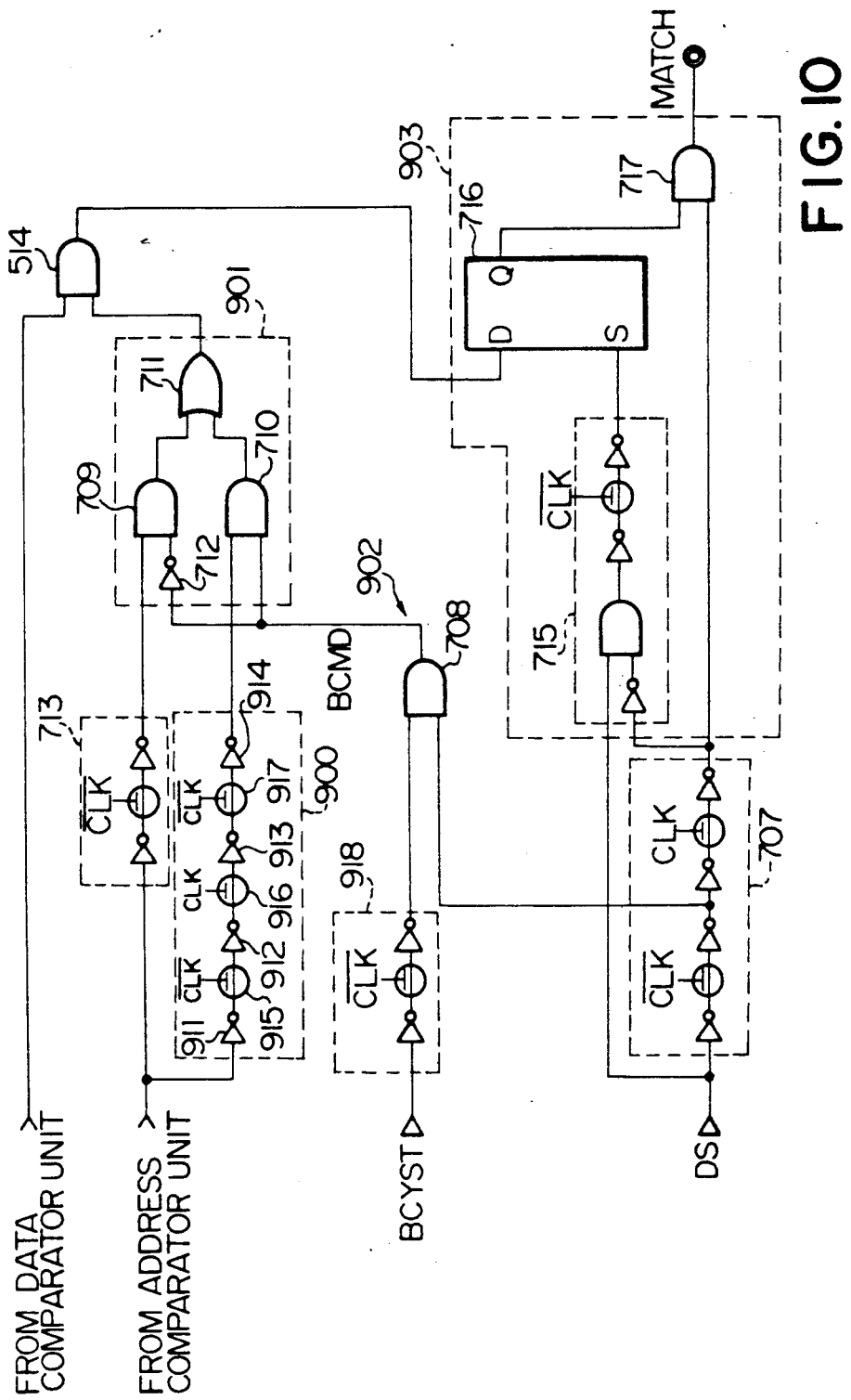
FIG. 10 is a circuit diagram showing the arrangement of an essential part of another microprocessor embodying the present invention.

Turning to FIG. 10 of the drawings, there is shown an essential part of a microprocessor according to the present invention which comprises a comparative result memorizing circuit 900, a multiplexer 901, a bus cycle mode signal producing circuit 902 and a matching signal producing circuit 903. However, these component circuits are similar in arrangement to those of the microprocessor 401, and, for this reason, corresponding elements are designated by like reference numerals without any detailed description for the sake of simplicity.

The comparative result memorizing circuit 900 comprises a delay circuit formed by a series combination of four inverter circuits 911, 912, 913 and 914 and three gate transistors 915, 916 and 917. The gate transistors 916 is supplied with the clock pulse CLK, however, the complementary clock signal is supplied to the gate transistors 915 and 917. The delay circuit 900 retards the address matching signal by one clock pulse interval, because the address signal is one clock ahead in the pipeline bus cycle. In this instance, since the delay circuit 900 can not be shared by the AND gate 708, a delay circuit 918 is provided in association with the AND gate 708. The bus cycle mode signal BCMD is produced by the AND gate 708 in the concurrent presence of the bus cycle starting signal BCYST and the bus cycle strobe signal DS and continue to remain in the active level in the pipeline bus cycle.

The multiplexer 901 is responsive to the bus cycle mode signal BCMD and selectively transfers the address matching signal to the AND gate 514. When the AND gate 514 produces the co-presence signal in the concurrent presence of the address matching signal and the data matching signal, and the co-presence signal is stored in the delay-type flip flop circuit 716 in response to the output signal of the timing generating circuit 715. The co-presence signal is ANDed with the full delayed bus cycle strobe signal DS to produce the matching signal MATCH for a predetermined time period. The predetermined time period is as long as the bus cycle strobe signal DS delayed by one clock pulse interval.

Figure 11:
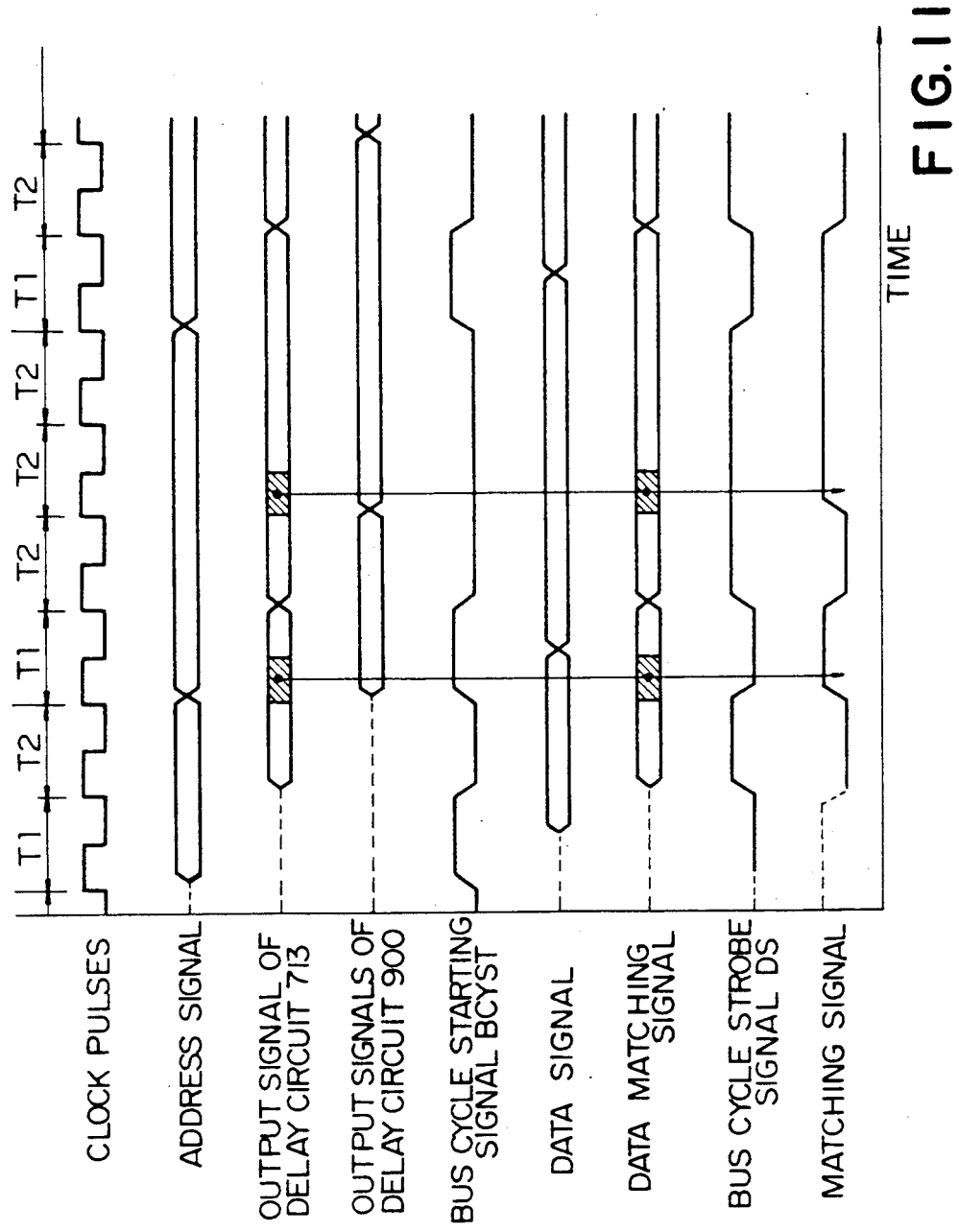
FIG. 11 is a timing chart showing the waveforms of essential signals produced in the microprocessor partially shown in FIG. 10 in the non-pipeline bus cycle.
Figure 12:
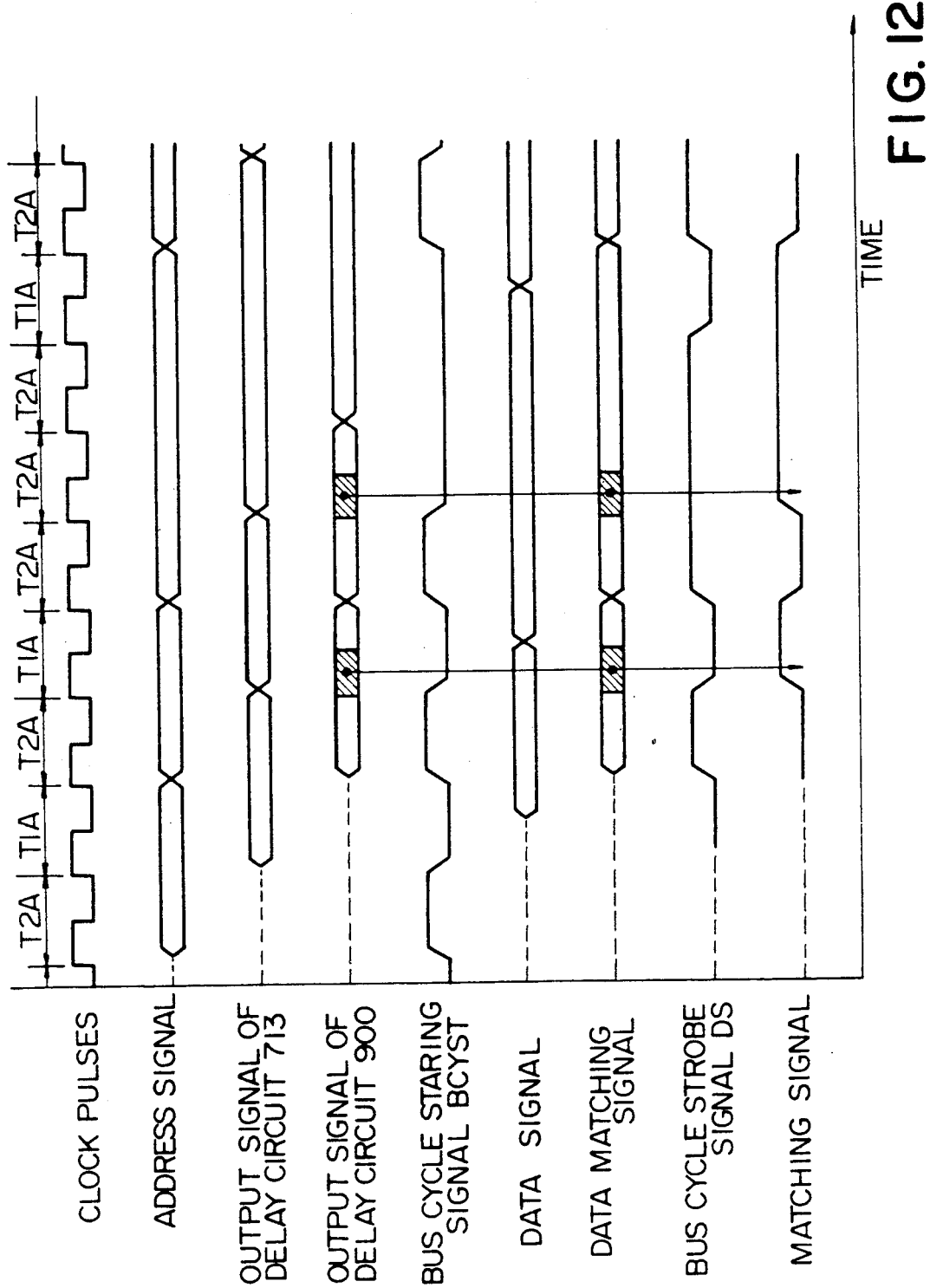
FIG. 12 is a timing chart showing the waveforms of essential signals produced in the pipeline bus cycle.

FIG. 11 shows the waveforms of essential signals produced in the microprocessor according to the present invention in the non-pipeline bus cycle. In the non-pipeline bus cycle, the multiplexer is transparent to the address matching signal supplied from the address comparator unit through the delay circuit 713, and, accordingly, the matching signal is produced in the concurrent presence of the address matching signal and the data matching signal. However, if the pipeline bus cycle is established, the multiplexer 901 transfers the output signal of the delay circuit 900 delayed by one clock interval with respect to the address matching signal, so that the matching signal MATCH is produced in the concurrent presence of the delayed address matching signal and the data matching signal as illustrated in FIG. 12.

Although particular embodiments of the present invention have been shown and described, it will be obvious to those skilled in the art that various changes and modifications may be made without departing from the spirit and scope of the present invention.

What is claimed is:

1. A microprocessor having a data processing mode and a monitoring mode of operation, said microprocessor being coupled to another microprocessor established in one of said data processing mode and said monitoring mode, said data processing mode of operation allowing said microprocessor or said another microprocessor to achieve a task given from the outside thereof, said monitoring mode of operation causing said microprocessor or said another microprocessor to see whether or not said another microprocessor or said microprocessor achieves said task without any error, said microprocessor established in said monitoring mode of operation being operative to compare address and data codes produced therein on the basis of an instruction code concurrently fetched by itself and said another microprocessor with corresponding address and data codes produced by said another microprocessor established in said data processing mode of operation, said microprocessor being responsive to a nonpipeline bus cycle and a pipeline bus cycle in both of said data processing mode and said monitoring mode of operation, said nonpipeline bus cycle causing said microprocessor and said another microprocessor to deliver address codes and data codes upon completion of the previous nonpipeline bus cycle, said pipeline bus cycle allowing said microprocessor and said another microprocessor to deliver at least address codes for the subsequent pipeline bus cycle, said microprocessor comprising:

a) an address code source supplying said address code to an internal address bus;
   b) a data code source supplying said data code to an internal data bus;
   c) address terminals selectively coupled to said internal address bus and said another microprocessor and supplied with said address code in said data processing mode of operation and with said corresponding address code in said monitoring mode of operation;
   d) data terminals selectively coupled to said internal data bus and said another microprocessor and supplied with said data code in said data processing mode of operation and with said corresponding data code in said monitoring mode of operation;
   e) address comparator means coupled at one end thereof to said internal address bus and at the other end thereof to said address terminals, and operative to compare said address code with said corresponding address code to produce an address matching signal representative of a coincidence between the address signal and the corresponding address signal in said monitoring mode of operation;
   f) data comparator means coupled at one end thereof to said internal data bus and at the other end thereof to said data terminals, and operative to compare said data code with said corresponding data code to produce a data matching signal representative of a coincidence between the data code and the corresponding data code in said monitoring mode of operation;
   g) delay means operative to retard said address matching signal by a predetermined time period, thereby producing a delayed address matching signal;
   h) matching signal producing means operative to produce a matching signal representative of a normal execution of said another microprocessor in the concurrent presence of said data matching signal and either address matching or delayed address matching signal; and
   i) selecting means operative to transfer said address matching signal to said matching signal producing means in said nonpipeline bus cycle and said delayed address matching signal to the matching signal producing means in said pipeline bus cycle.

2. A microprocessor as set forth in claim 1, in which said address comparator means comprise a plurality of comparator circuits coupled between said internal address bus, and said address terminals, and in which said data comparator means comprise a plurality of comparator circuits coupled between said internal data bus and said data terminals.

3. A microprocessor as set forth in claim 2, in which each of said comparator circuits comprises a three state buffer circuit transferring a bit of said address or data code to one of said address or data terminals in said data processing mode of operation but shifted into a high-impedance state in said monitoring mode of operation, and an exclusive OR gate having a first input node supplied with the bit of the address or data code and a bit of said corresponding address or corresponding data code in said monitoring mode of operation, a timing generating circuit operative to concurrently supply the bit of the address or data code and the bit of the corresponding address or corresponding data code to the exclusive OR gate, and a gate circuit coupled between a voltage line capable of propagating said address or data matching signal to said selecting means and a constant voltage source and controlled by the exclusive OR gate so as to produce the address or data matching signal.

4. A microprocessor as set forth in claim 3, in which said delay means comprises a temporal memory unit and a delay circuit.

5. A microprocessor as set forth in claim 4, in which said temporal memory unit is formed by a delay-type flip flop circuit.

6. A microprocessor as set forth in claim 3, in which said delay means comprising a delay circuit operative to retard said address matching signal by said predetermined time period.

* * * * *